(12) United States Patent
Marder

(10) Patent No.: US 9,977,990 B1
(45) Date of Patent: May 22, 2018

(54) COGNITIVE METHOD FOR VISUAL CLASSIFICATION OF VERY SIMILAR PLANAR OBJECTS

(71) Applicant: International Business Machines Corporation, Armonk, NY (US)

(72) Inventor: Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/401,040

(22) Filed: Jan. 8, 2017

(51) Int. Cl.
*G06K 9/46* (2006.01)
*G06T 7/11* (2017.01)
(Continued)

(52) U.S. Cl.
CPC ..... *G06K 9/4671* (2013.01); *G06F 17/30256* (2013.01); *G06F 17/30277* (2013.01); *G06K 9/3241* (2013.01); *G06K 9/6201* (2013.01); *G06K 9/6268* (2013.01); *G06T 7/11* (2017.01); *G06T 2207/10004* (2013.01)

(58) Field of Classification Search
CPC ......... G06F 17/30247; G06F 17/30256; G06F 17/3053; G06F 17/30277; G06F 17/30241; G06F 17/30424; G06F 17/30864; G06F 17/30253; G06F 17/30259; G06F 17/30554; G06F 17/30958; G06F 17/30477; G06F 17/30595; G06F 17/30047; G06F 17/3005; G06F 17/30442; G06F 17/30539; G06F 17/30654; G06F 17/30663; G06F 17/30675; G06F 17/30837; G06F 17/3087; G06Q 30/02; G06Q 30/0256; G06Q 30/0201; G06T 2207/20081; G06T 7/50; G06T 7/11; G06T 2207/10004; G06K 9/4671; G06K 9/00671; G06K 9/46; G06K 9/6211; G06K 9/6215; G06K 9/6232; G06K 9/00288; G06K 9/4676; G06K 2009/4666; G06K 9/3241; G06K 9/6201; G06K 9/6268
See application file for complete search history.

(56) References Cited

U.S. PATENT DOCUMENTS 5,586,197 A * 12/1996 Tsujimura ........... G06F 17/3025
382/162
5,652,881 A * 7/1997 Takahashi ........... G06F 17/3025
358/403
(Continued)

OTHER PUBLICATIONS

Timor Kadir et al., "Saliency, Scale and Image Description", International Journal of Computer Vision, Nov. 2001, vol. 45, Issue 2, pp. 83-105.
(Continued)

*Primary Examiner* — Manav Seth

(57) ABSTRACT

A cognitive system and method for visual classification of similar planar objects is disclosed. The method uses a query image and a list of candidate templates as the input, and produces the most probable candidate for the query image. The system uses the mutual saliency among a sample of points in the query templates, and selects those points with the highest saliency. The corresponding candidate templates to the points with the highest saliency are then compared to the query image, and those with the highest similarity are kept. The system has applications to industrial and commercial settings where processes require object recognition from image data.

20 Claims, 3 Drawing Sheets

(51) Int. Cl.
*G06K 9/62* (2006.01)
*G06K 9/32* (2006.01)
*G06F 17/30* (2006.01)

(56) References Cited

U.S. PATENT DOCUMENTS

| | | | | |
|---|---|---|---|---|
| 6,463,426 | B1* | 10/2002 | Lipson | G06F 17/30247 |
| 6,826,316 | B2* | 11/2004 | Luo | G06K 9/52 |
| | | | | 358/403 |
| 7,412,427 | B2* | 8/2008 | Zitnick | G06K 9/6211 |
| | | | | 706/20 |
| 7,860,854 | B2* | 12/2010 | Lipson | G06F 17/30247 |
| | | | | 707/707 |
| 8,027,549 | B2* | 9/2011 | Podilchuk | G06F 17/30277 |
| | | | | 382/159 |
| 8,369,407 | B2* | 2/2013 | Saoudi | G06F 17/30805 |
| | | | | 375/240.16 |
| 8,428,354 | B2 | 4/2013 | Prasad et al. | |
| 8,509,600 | B2* | 8/2013 | Hefeeda | H04N 5/913 |
| | | | | 386/252 |
| 8,560,517 | B2* | 10/2013 | Yang | G06F 17/30256 |
| | | | | 382/170 |
| 8,594,439 | B2 | 11/2013 | Staelin et al. | |
| 9,122,706 | B1* | 9/2015 | Holzschneider | G06F 17/30256 |
| 9,510,044 | B1* | 11/2016 | Pereira | H04N 21/44008 |
| 9,639,775 | B2* | 5/2017 | Sultana | G06K 9/6202 |
| 2009/0292701 | A1* | 11/2009 | Saoudi | G06F 17/30805 |
| 2010/0166339 | A1* | 7/2010 | Gokturk | G06F 17/30256 |
| | | | | 382/305 |
| 2013/0013578 | A1* | 1/2013 | Yang | G06F 17/30277 |
| | | | | 707/706 |
| 2015/0161474 | A1 | 6/2015 | Jaber et al. | |

OTHER PUBLICATIONS

Xiaoyu Wang et al., "Object-centric Sampling for Fine-grained Image Classification", Cornell University Library Computer Science > Computer Vision and Pattern Recognition, Dec. 2014.

Christian A. Mueller et al., "Object recognition in RGBD images of cluttered environments using graph-based categorization with unsupervised learning of shape parts", IEEE/RSJ International Conference on Intelligent Robots and Systems Date of Conference: Nov. 3-7, 2013.

* cited by examiner

COGNITIVE METHOD FOR VISUAL CLASSIFICATION OF VERY SIMILAR PLANAR OBJECTS

FIELD OF TECHNOLOGY

The present invention relates to the technical field of visual classification. In particular, the present invention relates to mobile capture and object recognition.

BACKGROUND OF THE INVENTION

In many retail and industrial scenarios, users are confronted with the task of detecting objects in mobile device photo captures. For example, retail outlets offer various products for sale. Recognizing the objects in these outlets can be important to future applications, such as automated checkout kiosks. The products have to be scanned at checkout. Currently, the process may require the movement of the product to align a barcode and items have to be processed one at a time. Customer queues may become bottlenecks during peak periods of customer demand, possibly causing the customers to leave the retail outlet entirely. Automating the process from the use of image data would improve the overall process and experience.

In other cases, a customer may want to inquire about an object without having detailed information about the object, such as its product number or name. Detecting objects based on image data would allow a person to inquire about such items without knowing detailed information about them.

Automated recognition within images of objects, such as people, animals, automobiles, consumer products, buildings, etc., is a difficult problem. Often the list of hypotheses is very long and the candidates show only subtle differences. Conventional approaches often implement supervised learning, which can require training sets of images that have been labeled. Thus, such conventional systems rely on direct human input to provide object exemplars explicitly labeled as representing the object, such as a set of images known to include, for example, dogs, based on prior human examination. However, such human input is expensive, time-consuming, and cannot scale up to handle very large data sets comprising hundreds of thousands of objects and millions of images.

What is needed is a method that classifies objects with much higher accuracy than previously used methods for planar objects.

SUMMARY OF INVENTION

A system provides automatic object recognition. The object recognition system is configured to perform an iterative operation on images, but can be extended to video. The system may operate in an integrated mobile device with a camera. The system receives image data from the camera and is able to recognize the objects within the image data.

In embodiments, a method for cognitive visual recognition comprises receiving a query image, receiving a list of candidate templates, aligning a set of hypotheses with the query image, selecting a sample of points in a set of query templates and measuring their mutual saliency, selecting the points with the highest saliency, measuring all the candidate templates at the points selected and comparing to the query image, and keeping the candidates with the highest similarity to the query image under the selected points. As an alternative, the method may select the points with the highest saliency by keeping a percentage of the points. As another alternative, the method may select the points with the highest saliency by K-means clustering. Optionally, the method may further perform the steps iteratively until a termination condition is reached, and the termination condition can be one candidate remaining.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

The system receives as an input a list of candidate templates and a query image. The list of candidate templates is a set of candidate objects or hypotheses. The query image can include a region of interest in that image.

In a divide and conquer manner, the system identifies the areas of highest variance among the candidate objects. The system measures the visual similarity at these areas and removes from the candidate list those candidates with highest dissimilarity with the query image at these specific spots. The system operates iteratively until only one candidate remains.

Figure 2:
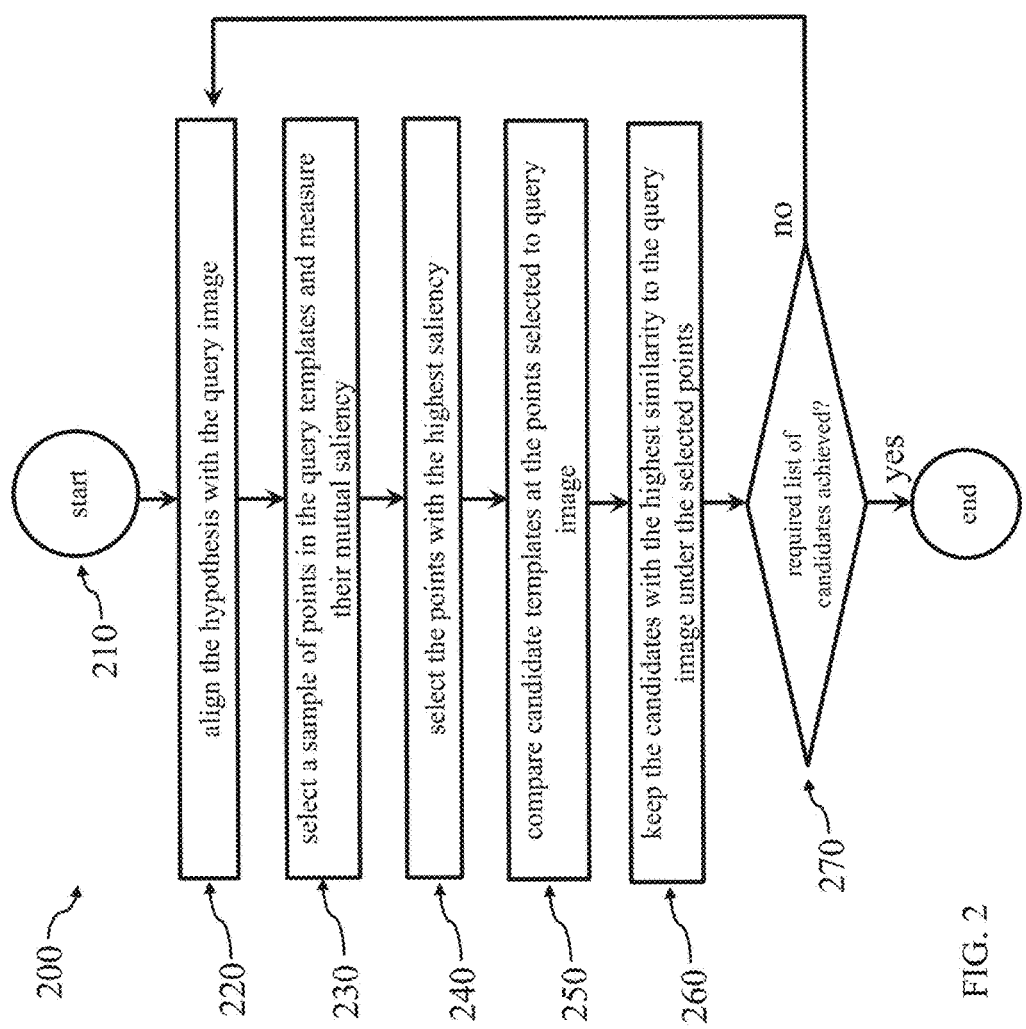
FIG. 2 illustrates a flow diagram of the visual classification system, according to an embodiment.

FIG. 2 illustrates a flow diagram 200 of the visual classification system, according to an embodiment. The process begins at step 210. In step 220, the system aligns the hypotheses (also referred to as candidate templates and query templates) with the digital query image. A hypothesis is a list of templates that have been detected to be feasible matches to an area in the query image. These lists can be short in many cases. The query image may comprise a representation of a planar object or a region of interest, and can be stored in a digital format. A computer vision system detects the approximate positioning of the hypotheses in the query image (i.e., the system perform image registration). The detection of the approximate position creates a hypothesis. The computer vision detection system may by itself give an accurate alignment between the hypotheses and the query image. If such an alignment is not given by the computer vision detection system, the alignment may be achieved by applying a classical image alignment algorithm between the hypotheses and the already generated approximate position of the hypotheses within the query image. The hypotheses can be a list of preloaded images on the computer vision system. The hypotheses can have other descriptive information associated with each hypothesis image in the set.

In step 230, the system selects a sample of points in the query templates and measures their mutual saliency. The sample of points can be randomly sampled in an embodiment. In alternative embodiments, they are sampled on a grid or sampled according a feature point extraction function, such as Harris corner detection, FAST, or SIFT.

As the hypotheses are mutually aligned, the system can measure how the image feature (e.g., gray value, color value, or a high dimensional feature vector like SIFT) of a particular position, or sample point, varies between hypotheses. If the hypotheses are similar at a position, the variance between them is low; if they are different, the variance is high. The points with a high variance are referred to as having high saliency.

In step 240, the system selects the points with the highest saliency. This step can be done by using, as an example, the top 30% or by K-means clustering. The system attempts to separate all of the sample points into groups. Those points that differentiate the hypotheses the most lie on image details, and those points that are quite similar lie between the images. K-means clustering divides the set of feature variances in to K groups. In an embodiment, the system can choose K=2, but other K values can be chosen.

In step 250, the system compares the candidate templates at the points selected (hypotheses) to the query image at the sample points selected by the K-means clustering (it is optional to use a different image descriptor at this step). One could, for example, use FAST in the previous step and SIFT in this step. There is a computational benefit in reusing the previously already computed descriptor, but it is not strictly necessary.

In step 260, the system keeps the candidates with the highest similarity to the query image under the points selected in step 240. In step 270, the system determines if the required list of candidates has been achieved. That is, the list of candidates is sufficiently small (e.g., size 2), or the current top candidate is significantly more similar than any other hypotheses. If the required list of candidates has been achieved, the process terminates. Otherwise, the system returns to step 220. The output of the system is the most probable candidate for the query image.

Figure 1:
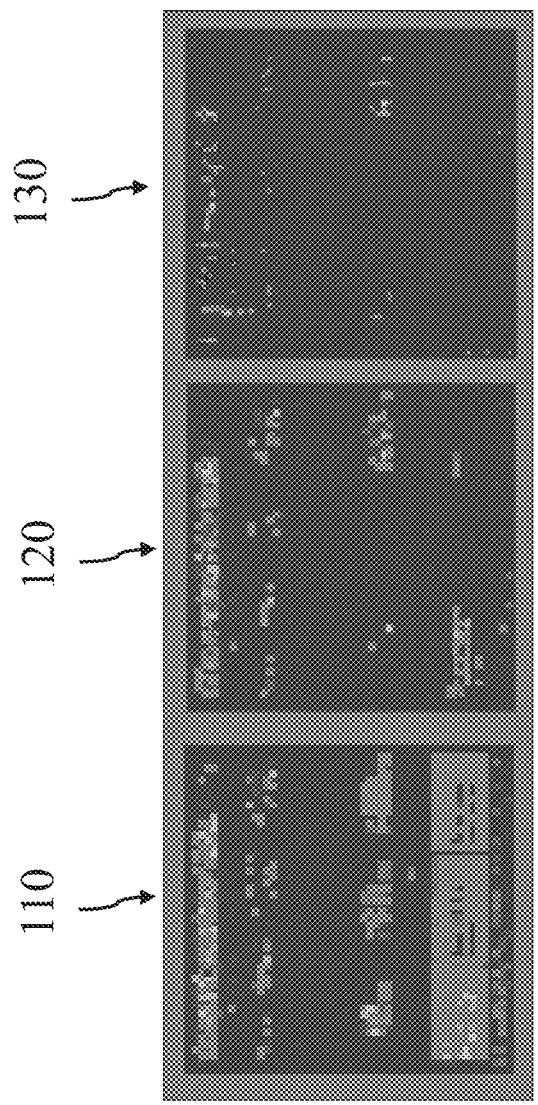
FIG. 1 shows the results from several iterations of the above process on a sample set of data, according to an embodiment of the present invention.

FIG. 1 shows the results (i.e., the set of most differentiating sample points) from several iterations of the above process on a sample set of data, according to an embodiment of the present invention. The results of the first 110, second 120, and third 130 iteration are shown. The system achieved a 97% classification rate on a challenging data set where text primarily constituted the difference between the templates. The first set of most differentiating sample points are shown in the first iteration 110. In the second iteration 120, only the hypotheses that survived the first iteration are seen. Among them, the set of salient (differentiating) points is even smaller. In the third iteration 130, one can see the sample points of an even smaller subset of hypothesis. The images illustrate how the system focuses in more and more on to the details that differentiate between the candidates that are the most similar to the query image. In this example, the data that was used was a square price tag. Most parts of all price tags are similar if not identical. In the very last iteration one typically sees the price tags of a product from the same brand and product line.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

Figure 3:
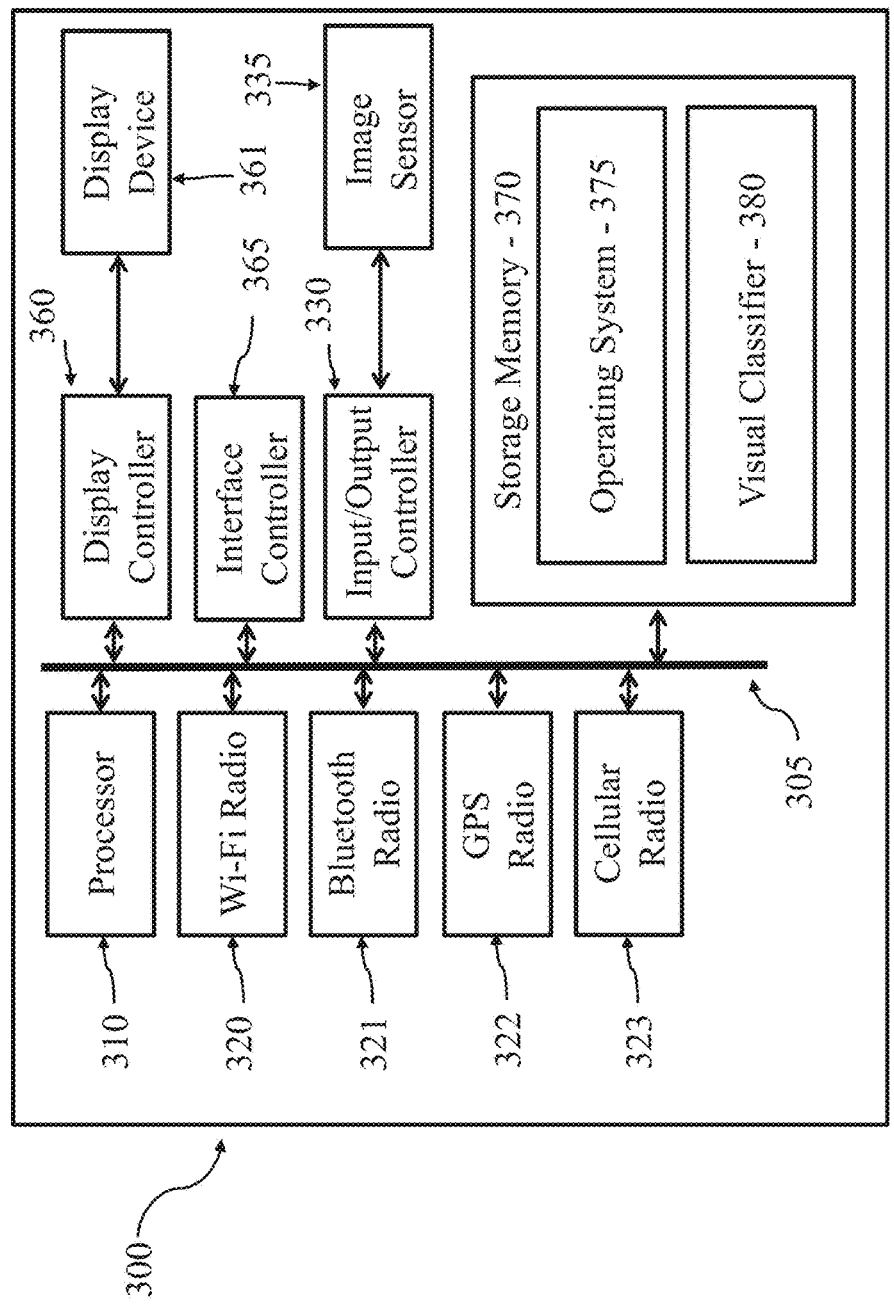
FIG. 3 illustrates a system diagram for a mobile device, according to an embodiment of the present invention.

FIG. 3 illustrates a system diagram for a mobile device 300, according to an embodiment of the present invention. The mobile device comprises several hardware components, including a processor 310, Wi-Fi radio, a Bluetooth radio 321, a GPS radio 322, a cellular radio 323, a display controller 360, a display device 361, an interface controller 365, an input/output controller 330, an image sensor 335, and storage memory 370. A computer bus 305 may be present to tie the various components together, or the various components may interface directly with each other.

The storage memory 370 may be any computer readable storage medium and can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The storage memory 370, in an embodiment, comprises the computer readable program instructions for the visual classifier 380. The storage memory may come preloaded with the hypotheses or candidate templates, and may be coupled to other components, such as the digital imager, to store the captured images. In addition, the storage memory may contain an operating system 375. The visual classifier can be an executable program stored in the storage memory 370. The operating system can be, for example, Linux, UNIX®, MACOS, iOS, or Windows®. The visual classifier 380 can be run in its own address space within the operating system.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. The network connection can be established via the device's Wi-Fi radio 320, Bluetooth radio 321, or cellular radio 323.

Computer readable program instructions for carrying out operations of the present invention may be any instruction type compatible with the processor 310, such as assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The visual classifier 380 may receive the image data from an image sensor 335, such as a camera, CCD, CMOS device, or other digital imaging device. The image sensor may operate in conjunction with an input/output controller 330 to adapt the image sensor to the digital platform.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus for cognitive visual recognition, the apparatus comprising:
   a memory device comprising a list of candidate templates;
   an optical recording device configured to capture a digital query image and store the digital query image on the memory device; and
   a processor coupled to the memory device and configured to:
      retrieve the digital query image from the memory device,
      retrieve the list of candidate templates from the memory device,
      align each candidate template in the list of candidate templates with the digital query image,
      select a set of sample points of each candidate template in the list of candidate templates,
      measure a mutual saliency of the set of sample points,
      select a set of highest mutual saliency points from the set of sample points based on the mutual saliency,
      measure the similarity of each candidate template in the list of candidate templates to the query image at the set of highest mutual saliency points, and
      generate a list of highest similarity candidates based on the measured similarity.

2. The apparatus of claim 1, wherein selecting a set of highest mutual saliency points from the set of sample points comprises retaining a percentage of the set of sample points.

3. The apparatus of claim 1, wherein selecting a set of highest mutual saliency points from the set of sample points comprises K-means clustering.

4. The apparatus of claim 1, wherein the digital query image comprises a representation of a planar object.

5. The apparatus of claim 1, wherein the digital query image comprises a region of interest.

6. An apparatus for cognitive visual recognition, the apparatus comprising:
   a memory storage device comprising a list of candidate templates; and
   a digital imager configured to:
      capture a digital image, and
      store the digital image on the memory storage device; and
   a processor configured to:
      receive the digital image,
      receive the list of candidate templates,
      align each candidate template in the list of candidate templates with the digital image,
      select a set of sample points of each candidate template in the list of candidate templates and measure their mutual saliency,
      select a set of highest mutual saliency points from the set of sample points, measure the similarity of each candidate template in the list of candidate templates to the image at the set of highest mutual saliency points, and
      remove at least a lowest similarity candidate from the list of candidate templates.

7. The apparatus of claim 6, wherein selecting a set of highest saliency points from the set of sample points comprises retaining a percentage of the points.

8. The apparatus of claim 6, wherein selecting a set of highest saliency points from the set of sample points comprises K-means clustering.

9. The apparatus of claim 6, wherein the digital image comprises a representation of a planar object.

10. The apparatus of claim 6, wherein the digital image comprises a region of interest.

11. A method for cognitive visual recognition comprising:
   a. receiving a digital query image from a digital imaging device;
   b. receiving a list of candidate templates;
   c. aligning the list of candidate templates with the digital query image;
   d. selecting a set of sample points in the list of candidate templates and measuring their mutual saliency;
   e. selecting a set of highest mutual saliency points from the set of sample points;
   f. measuring a similarity of each candidate template in the list of candidate template to the digital query image at the set of highest mutual saliency points; and
   g. generating a list of highest similarity candidates based on the measured similarity.

12. The method of claim 11, wherein selecting a set of highest saliency points from the set of sample points comprises keeping a percentage of the points.

13. The method of claim 11, wherein selecting a set of highest saliency points from the set of sample points comprises K-means clustering.

14. The method of claim 11, wherein measuring the similarity of candidate templates comprises measuring an image feature, wherein the image feature is selected from the group consisting of gray value, color value, and SIFT.

15. The method of claim 11, further comprising performing steps a through g iteratively until a termination condition is reached.

16. The method of claim 15, wherein the termination condition is one candidate remaining.

17. The method of claim 15, wherein the termination condition is two candidates remaining.

18. The method of claim 15, wherein the termination condition is a top candidate is significantly more similar than any other hypotheses.

19. The method of claim 11, wherein the digital query image comprises a representation of a planar object.

20. The method of claim 11, wherein the digital query image comprises a region of interest.

* * * * *